US012671643B2

(12) United States Patent
Miller et al.

(10) Patent No.: US 12,671,643 B2
(45) Date of Patent: Jun. 30, 2026

(54) ANOMALY DETECTION MECHANISM EVALUATIONS

(71) Applicant: Cisco Technology, Inc., San Jose, CA (US)

(72) Inventors: Gad Miller, Paris (FR); Tristan Hugues Emile Victor Besson, Saint-Cyr-l'École (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/643,006

(22) Filed: Apr. 23, 2024

(65) Prior Publication Data

US 2025/0330402 A1 Oct. 23, 2025

(51) Int. Cl.
H04L 43/08 (2022.01)
H04L 9/40 (2022.01)

(52) U.S. Cl.
CPC .......... H04L 43/08 (2013.01); H04L 63/1425 (2013.01)

(58) Field of Classification Search
CPC ............................ H04L 43/08; H04L 63/1425
See application file for complete search history.

(56) References Cited

U.S. PATENT DOCUMENTS 11,115,309 B1 * 9/2021 Scholl ...................... H04L 43/12
2016/0352766 A1 * 12/2016 Flacher ................... H04L 12/28

| | | | |
|---|---|---|---|
| 2017/0279836 A1 * | 9/2017 | Vasseur ............... | H04L 63/1425 |
| 2017/0279838 A1 * | 9/2017 | Dasgupta ............ | H04L 63/1425 |
| 2019/0213446 A1 * | 7/2019 | Tsou ....................... | H04W 4/38 |
| 2019/0220339 A1 | 7/2019 | Qiao et al. | |
| 2020/0201701 A1 | 6/2020 | Wang et al. | |
| 2020/0287920 A1 * | 9/2020 | Mandrychenko ... | H04L 67/5651 |
| 2020/0364607 A1 | 11/2020 | Bahenatapia et al. | |
| 2022/0342861 A1 | 10/2022 | Gonzalez Macias et al. | |
| 2023/0038164 A1 * | 2/2023 | Naeini ................... | G06N 5/022 |
| 2023/0237044 A1 | 7/2023 | Parthasarathy et al. | |
| 2023/0327971 A1 * | 10/2023 | Kolar ..................... | H04L 43/12 709/224 |
| 2024/0330096 A1 * | 10/2024 | Jha ....................... | G06F 11/3089 |
| 2024/0333737 A1 * | 10/2024 | Shahrivar ........... | H04L 63/1425 |

FOREIGN PATENT DOCUMENTS

WO 2022026022 A1 2/2022

* cited by examiner

*Primary Examiner* — Benjamin R Bruckart
(74) *Attorney, Agent, or Firm* — Merchant & Gould P.C.; Kenneth J. Heywood

(57) ABSTRACT

In one implementation, a device may obtain anomaly detection time series indicative of anomalies detected by a plurality of anomaly detectors for a network. The device may determine a degree of correlation over time between the anomaly detection time series. The device may make, based on the degree of correlation over time between the anomaly detection time series, a performance evaluation for a particular anomaly detector from among the plurality of anomaly detectors. The device may provide the performance evaluation to a user interface for review.

18 Claims, 6 Drawing Sheets

500

600

605 START

610 OBTAIN ANOMALY DETECTION TIME SERIES

615 DETERMINE A DEGREE OF CORRELATION OVER TIME BETWEEN THE ANOMALY DETECTION TIME SERIES

620 MAKE, BASED ON THE DEGREE OF CORRELATION, A PERFORMANCE EVALUATION FOR A PARTICULAR ANOMALY DETECTOR

625 PROVIDE THE PERFORMANCE EVALUATION TO A USER INTERFACE FOR REVIEW

630 END

ANOMALY DETECTION MECHANISM EVALUATIONS

TECHNICAL FIELD

The present disclosure relates generally to anomaly detection mechanism evaluations.

BACKGROUND

Anomaly detection now plays a central role in maintaining the operability and security of many networks. Typically, these anomaly detection mechanisms operate by assessing time series data from the network (e.g., telemetry data, performance data, traffic patterns, observability data, etc.) to identify irregular patterns or behaviors indicative of abnormal conditions such as system failures, security breaches, and other critical issues. Consequently, how well the anomaly detection mechanism performs can greatly affect the operations of the network, as failure to detect an anomaly can lead to the abnormal condition persisting.

It is often challenging to evaluate the performance of an anomaly detection mechanism, as well as compare the performances of different anomaly detection mechanisms, due to the absence of ground truth data given the lack of availability of training sets and/or labeled data. Indeed, without verified labels indicating the presence or absence of anomalies, it becomes very challenging to determine whether an anomaly detection mechanism is performing in a satisfactory manner. In some instances, it may be possible to rely on simulated data and/or manual labeling to assess the performance of the anomaly detection mechanism. However, these approaches also suffer from potential biases, inaccuracies, and an inability to scale well. Because of this, network administrators often deploy sub-optimal anomaly detection mechanisms to their networks, unaware of their decreased performance and leading to degraded network operability and security.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

According to one or more implementations of the disclosure, a device obtains anomaly detection time series indicative of anomalies detected by a plurality of anomaly detectors for a network. The device may determine a degree of correlation over time between the anomaly detection time series. The device may make, based on the degree of correlation over time between the anomaly detection time series, a performance evaluation for a particular anomaly detector from among the plurality of anomaly detectors. The device may provide the performance evaluation to a user interface for review.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
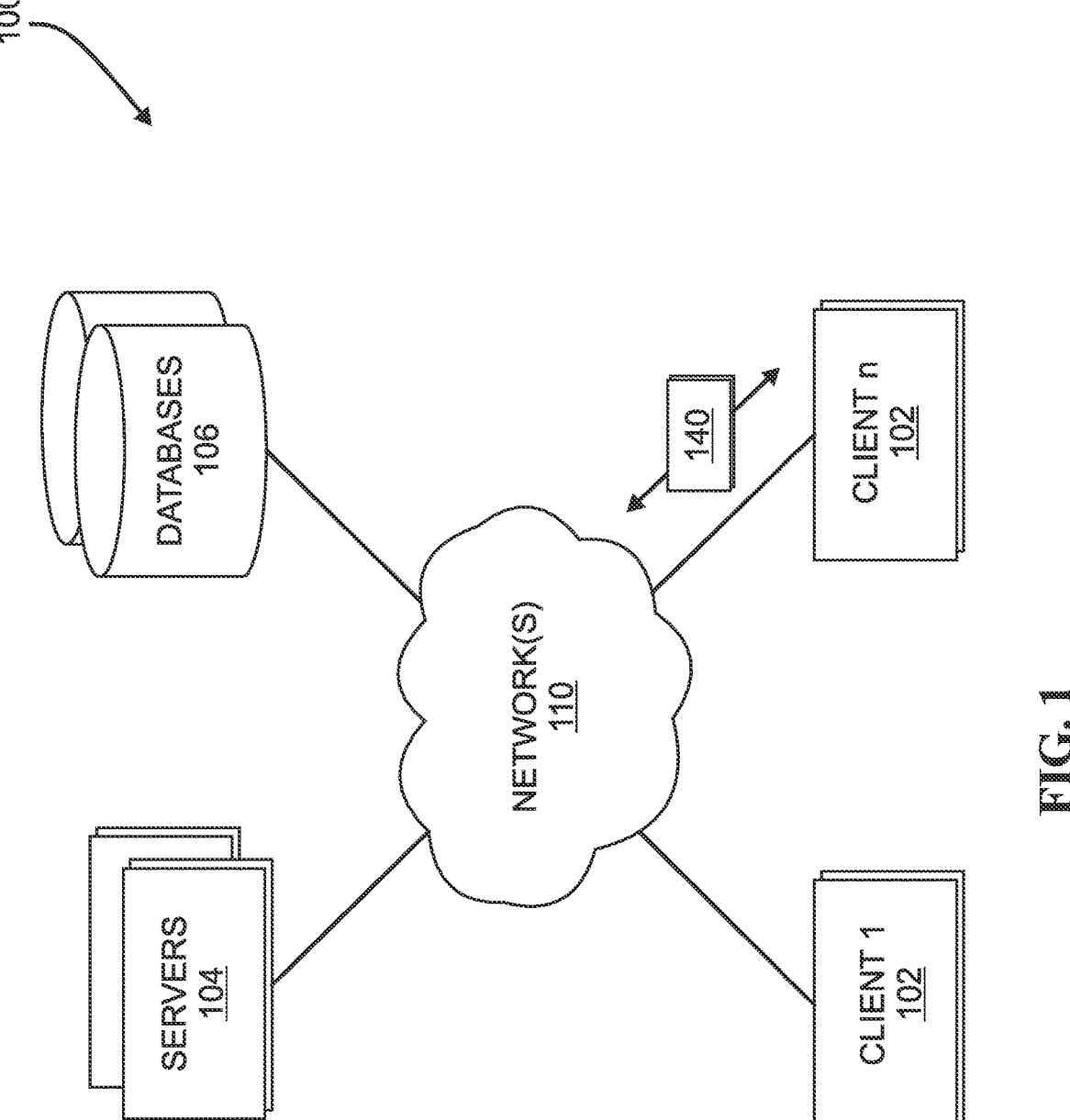
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
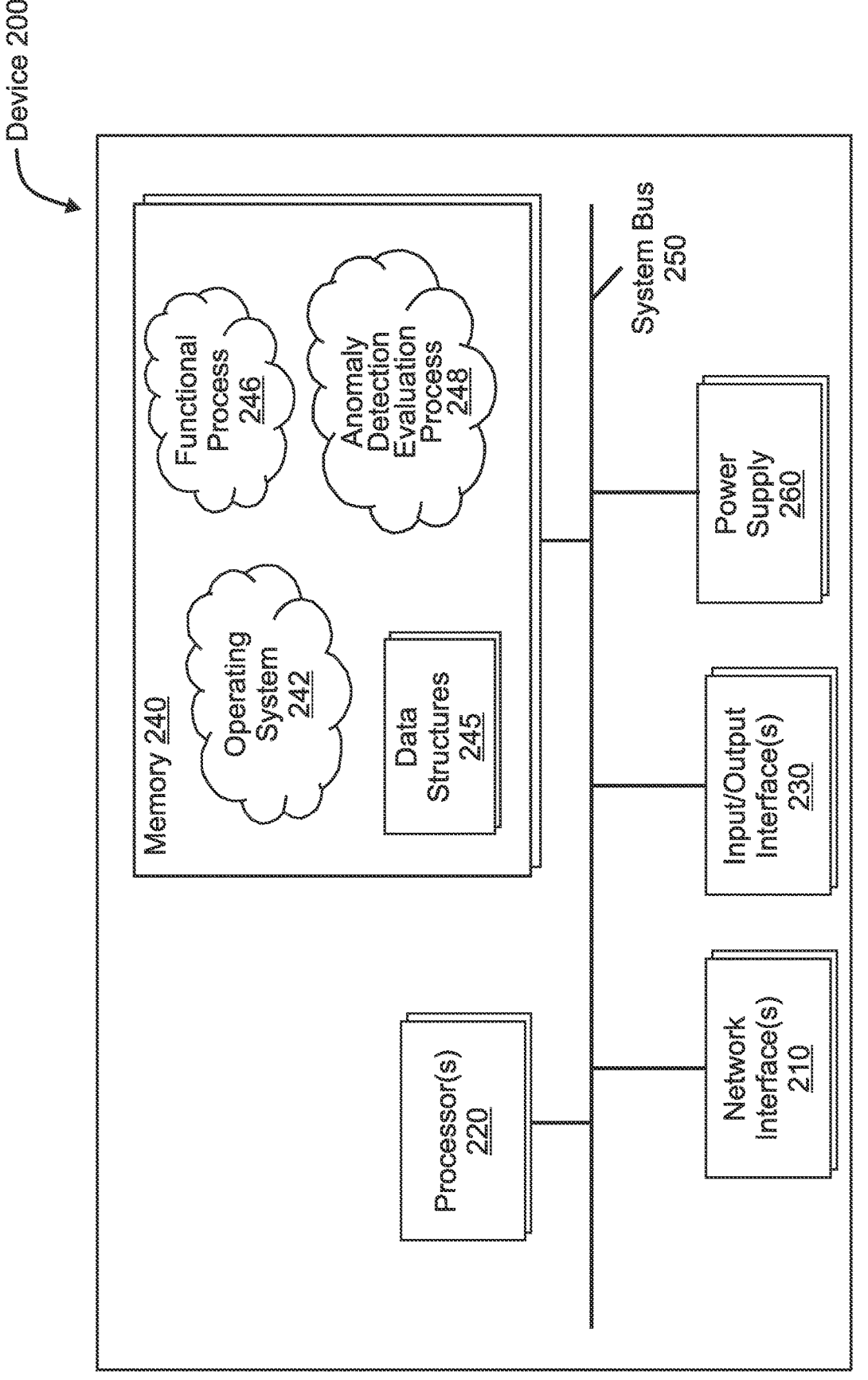
FIG. 2 illustrates an example computing device/node.

FIG. 2 is a schematic block diagram of an example node/device 200 (e.g., an apparatus) that may be used with one or more implementations described herein, e.g., as any of the devices shown in FIG. 1 above. Device 200 may comprise one or more network interfaces, such as interfaces 210 (e.g., wired, wireless, network interfaces, etc.), at least one processor (e.g., processor(s) 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor(s) 220 and the interfaces 210 for storing software programs and data structures associated with the implementations described herein. The processor(s) 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an anomaly detection evaluation process 248, as described herein. Notably, functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, anomaly detection evaluation process 248 may include computer executable instructions that, when executed by processor(s) 220, cause device 200 to perform the techniques described herein. To do so, in some implementations, anomaly detection evaluation process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, anomaly detection evaluation process 248 may employ one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that anomaly detection evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

In further implementations, anomaly detection evaluation process 248 may also include, or otherwise use, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, anomaly detection evaluation process 248 may use a generative model to generate configurations based on a conversational input from a user (e.g., voice, text, etc.). Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
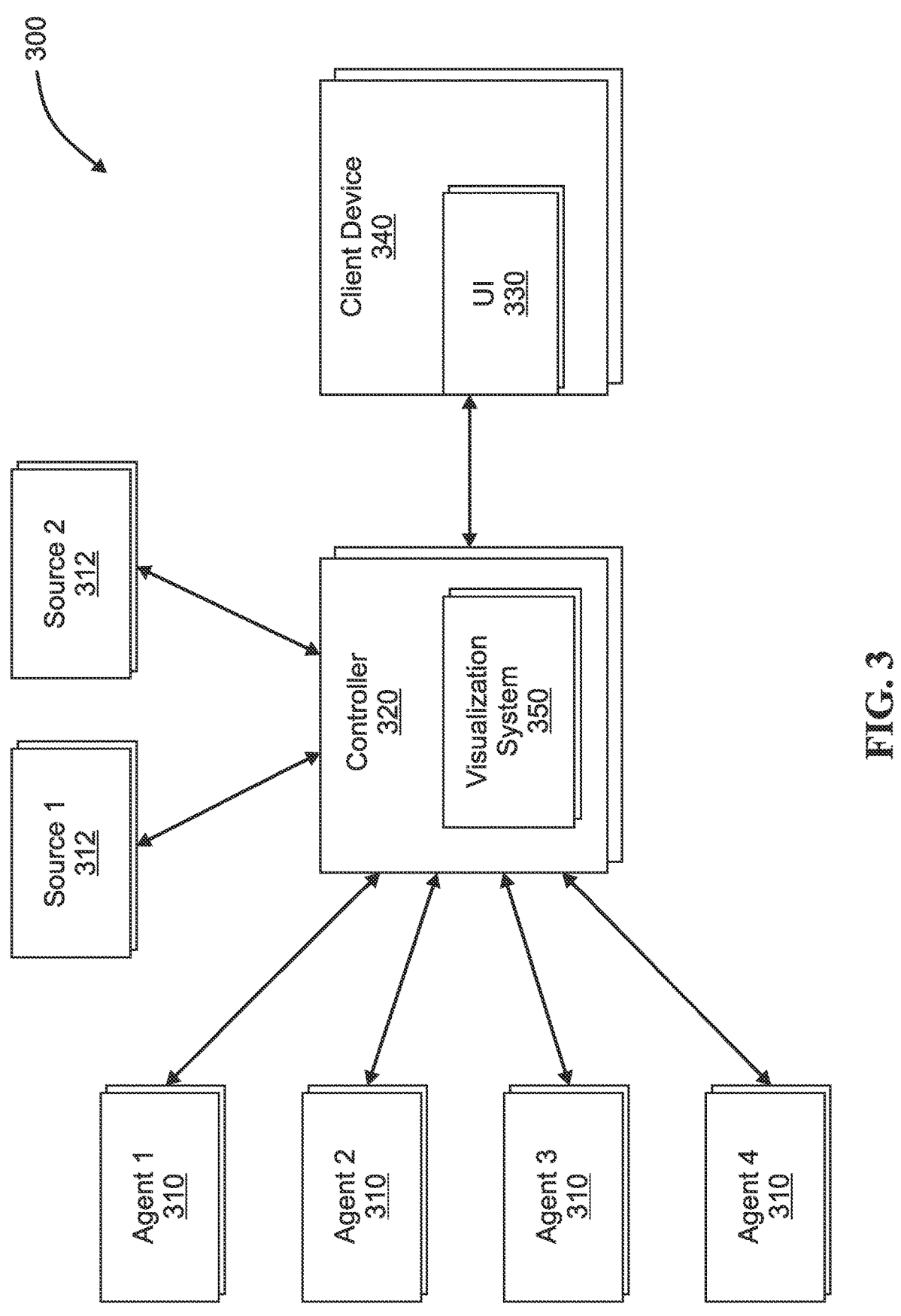
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page— e.g., load a shopping website, log in, search for an item, add it to the shopping cart, etc.).

The controller 320 is the central processing and administration server for the observability intelligence platform. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one implementation, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain implementations, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

As noted above, reliable evaluation and comparison of anomaly detection mechanisms in digital communication and computation networks is not feasible in the absence of ground truth data (e.g., lack of availability of training sets and/or labeled data). For example, consider the challenge of developing an anomaly detection method for scalar time-series, given a variety of heterogeneous time-series to train on but no labels indicating the ground truth existing for these time-series. In such conditions, one can only resort to various heuristics when doing the unsupervised optimization of the anomaly detection mechanism. These heuristics are typically difficult to justify.

Ultimately, without verified labels indicating the presence or absence of anomalies, there is no basis upon which a reliable evaluation or comparison of performance of anomaly detection mechanisms can be performed. Consequently, these networks and their constituent devices suffer from impaired performance, increased security risks, delayed maintenance and repairs, compliance failures, capacity planning failures, etc. occurring within a blind spot for network administrators.

—Anomaly Detection Mechanism Evaluations—

In contrast, the techniques described herein provide a mechanism for evaluation and comparison of the quality of different anomaly detection mechanisms. This mechanism leverages knowledge about the way that data series are generated, which induces correlation in the expected results of different correlated time series. The mechanism utilizes correlation between the different time series to serve as a measure of the quality of an anomaly detection mechanism.

Illustratively, the techniques described herein may be performed by hardware, software, and/or firmware, such as in accordance with anomaly detection evaluation process 248, which may include computer executable instructions executed by the processor(s) 220 (or independent processor of interfaces 210) to perform functions relating to the techniques described herein.

Specifically, according to various implementations, a device obtains anomaly detection time series indicative of anomalies detected by a plurality of anomaly detectors for a network. The device may determine a degree of correlation over time between the anomaly detection time series. The device may make, based on the degree of correlation over time between the anomaly detection time series, a performance evaluation for a particular anomaly detector from among the plurality of anomaly detectors. The device may provide the performance evaluation to a user interface for review.

Figure 4:
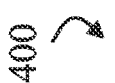
FIG. 4 illustrates an example of an architecture for implementing anomaly detection mechanism evaluations.
Figure 4:
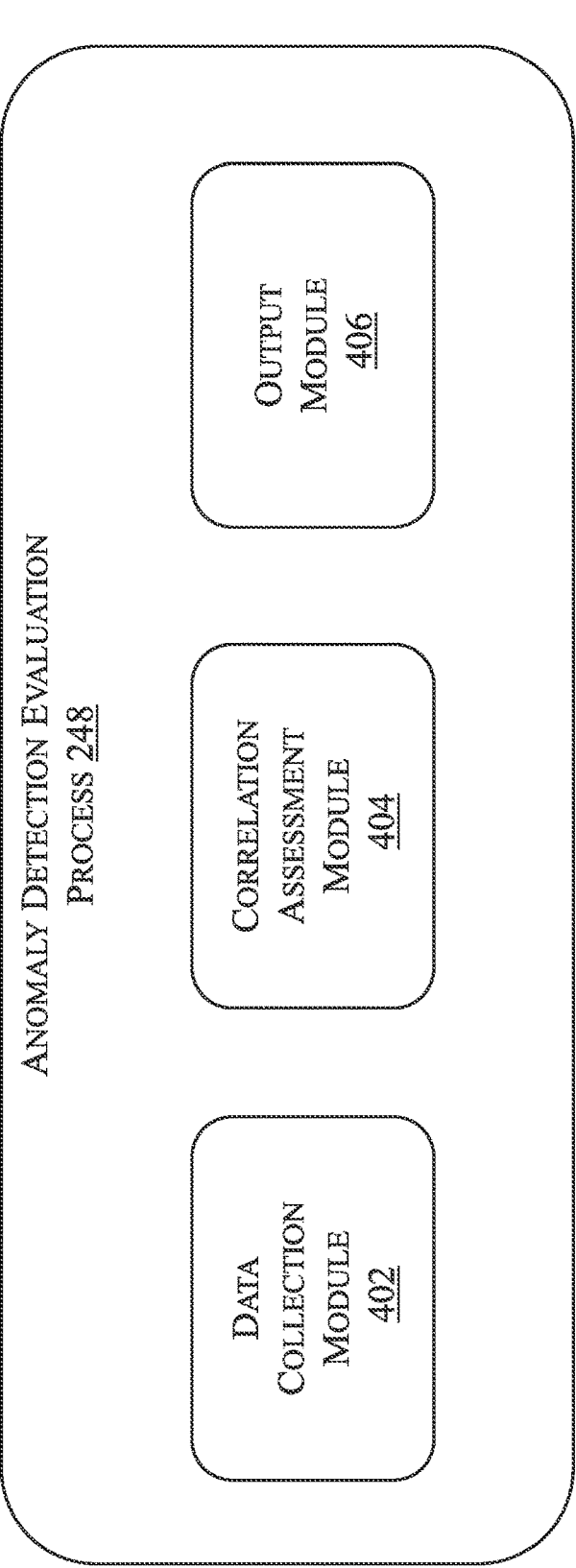

Operationally, FIG. 4 illustrates an example architecture 400 for implementing anomaly detection mechanism evaluations, according to various implementations. At the core of architecture 400 is anomaly detection evaluation process 248, which may be executed by a controller for a network or another device in communication therewith. For instance, anomaly detection evaluation process 248 may be executed by a controller for a network, a particular networking device in the network (e.g., a router, a firewall, etc.), a server, another device or service in communication therewith, or the like. The anomaly detection evaluation process 248 may be executed as a component of and/or in coordination with an observability intelligence platform (e.g., observability intelligence platform 300).

As shown, anomaly detection evaluation process 248 may include any or all of the following components: a data collection module 402, a correlation assessment module 404, and/or an output module 406. As would be appreciated, the functionalities of these components may be combined or omitted, as desired. In addition, these components may be implemented on a singular device or in a distributed manner, in which case the combination of executing devices can be viewed as their own singular device for purposes of executing anomaly detection evaluation process 248.

When executed, data collection module 402 may obtain anomaly detection time series collected from a network and/or networked devices. A plurality of anomaly detectors may generate an anomaly detection time series based on outputs of testing agents configured to perform testing at different points in the network. For instance, such testing agents may perform testing in the network by sending probing packets via the network to collect path performance metrics such as packet loss, delays, round trip times, jitter, throughput, or the like. In turn, the anomaly detection agents may assess such metrics over time, to generate the anomaly detection time series that data collection module 402 collects.

In some instances, the anomaly detection time series may also be associated with the testing agents performing testing in the network with respect to a particular server or other targeted networked component. For instance, different testing agents may send probing packets towards a target server. In various implementations, the system may also select particular testing agents either automatically or based on manual selection by an administrator (e.g., selected based on their relationship to and/or ability to reach the target server, networking device, etc.).

More specifically, the anomaly detectors/detection agents may generate their anomaly detection time series based on outputs of the testing agents, which may include telemetry data, performance data, traffic patterns, observability data, etc. and/or metrics thereof collected from a network, network devices, and/or an application environment being monitored. Such anomaly time series can be indicative of the state of a probed or otherwise monitored network entity (e.g., whether that entity is operating as expected or not) and can provide insight into any underlying issues.

As would be appreciated, the specific deployment of probing agents, anomaly detectors/anomaly detection agents, and anomaly detection evaluation process 248 can vary as desired. For instance, in some cases, each testing agent itself may perform anomaly detection on the data that it obtains via testing and export its anomaly detection time series (and potentially any associated information) to data collection module 402. In other cases, the testing agents may send their captured information to designated anomaly detectors in the network, who then send the anomaly detection time series (and potentially any associated information) to data collection module 402. In yet further implementations, data collection module 402 may itself receive the data collected by the testing agents and apply different anomaly detectors to them, to obtain the anomaly detection time series.

Typically, the anomaly detection time series will indicate when the underlying metric (e.g., delay, round trip time, CPU load, queue length, etc.) deviates from its expected behavior. Of course, what the anomaly detection model considers to be anomalous can also be time-varying. For instance, the network load associated with a certain network entity may be considerably lower at night than during business hours. Often, anomaly detection models operate by comparing the expected value of the underlying metric at a certain point in time to its observed value and, if the delta exceeds a certain threshold, outputting an indication that an anomaly exists. For instance, if the expected packet loss at 12:05 AM is 0.003% and the observed packet loss at that time was 2%, the anomaly detector may determine that this behavior is anomalous.

As noted above one challenge with respect to using multiple anomaly detectors in a distributed system, such as a computer network, is that certain anomaly detectors may perform better than others. Indeed, what one anomaly detection model considers to be 'normal' or 'anomalous' may differ from that of another anomaly detection model, when faced with the same underlying conditions. Evaluating the performance of any given anomaly detector, though, can be quite challenging.

According to various implementations, correlation assessment module 404 may evaluate the quality of different anomaly detectors (or, more specifically, their underlying anomaly detection models) and compare their performances, based on the data collected by data collection module 402. To do so, correlation assessment module 404 may conduct this evaluation by first grouping together different anomaly detection time series from different anomaly detectors that are all related to some common, underlying metric (e.g., path delay, round trip time, etc.). In some instances, correlation assessment module 404 may also select the set of anomaly detectors and their anomaly detection time series to compare based on a common network entity associated with their time series (e.g., a target server, etc.).

For a given percentage of detected anomalies, correlation assessment module 404 may utilize the amount of correlation between the different series as a measure of the anomaly detection quality. Here, the assumption is that the anomaly detection time series from a well-performing anomaly detector will exhibit a high positive correlation with those of the other anomaly detectors in its cohort. Conversely, an anomaly detector that performs poorly (e.g., low precision and reliability) may randomly declare anomalies with some probability, leading to low or even no correlation with the anomaly detection time series from the other anomaly detectors.

Accordingly, correlation assessment module 404 may utilize the correlation between the different series as a measure of the quality of the anomaly detection mechanism that produced them. For instance, correlation assessment module 404 may measure the degree of correlation between anomaly time series in the same group by counting the number of anomalies at each point in time for such a group of time series. Then, correlation assessment module 404 may utilize the sum of these counts, each multiplied by itself minus one, as a robust measure of the intra-group correlation between anomaly time series.

For example, two time series generated by different agents of a given observability intelligence platform test of a property of the same server may be collected by data collection module 402. If an anomaly which is detected in the first time series is spurious, that is—it was wrongly detected as an anomaly, or a false alert, then there is no reason for the second time series to have an anomaly at the same point in time, beyond the a-priori probability of having a spurious alert. On the other hand, some proportion of true alerts may be caused by issues in factors which might be common to several agents executing the same test, such as an issue in the target server on in a common part of the routing path. As such, alert signals from different agents of the same test may be positively correlated. The anomaly detection mechanisms that are consider by correlation assessment module 404 may be ones which consider individual time series (i.e., data generated by a single agent) as opposed to algorithms which would work using a vector time series. This may be important for the independence assumption of the wrongly detected anomalies outlined below.

For instance, $A_1$ and $A_2$ may be two different agents performing a common test of a server S at a given time. In such an instance, events may be denoted as:

$$\mathcal{A}_i = \text{Anomaly detected for agent } A_i$$

$$\mathcal{S} = \text{Server } S \text{ experienced issues.}$$

Further, the probabilities may be denoted as:

$$p = P(\mathcal{A}_i | \mathcal{S}) \text{ for } i = 1, 2$$

that is, given that the server experiences an issue, there may be the same probability p of detecting an anomaly for all agents. Similarly, $$q = P(\mathcal{A}_i | \mathcal{S}^c) \text{ for } i = 1, 2.$$

That is, q is the probability of detecting an anomaly for an agent when the server does not experience an issue. Finally, the a priori probability of having a server issue at a given time may be denoted by $$s = P(S).$$

Correlation assessment module 404 may rely on assumptions such as:
1. $P(\mathcal{A}_i | \mathcal{S}) > P(\mathcal{A}_i | \mathcal{S}^c)$, or p>q. In other words, all other things being equal, the probability of detecting an anomaly is greater if there is a server issue than if there isn't one; and 2. $P(\mathcal{A}_1, \mathcal{A}_2|\mathcal{S}) = P(\mathcal{A}_1|\mathcal{S})P(\mathcal{A}_2|\mathcal{S})$. That is, $\mathcal{A}_1$ and $\mathcal{A}_2$ are independent given $\mathcal{S}$.

These properties may entail a positive correlation between anomalies detected across different agents. This may be illustrated utilizing the law of total probability:

$$P(\mathcal{A}) = P(\mathcal{A}|\mathcal{S})P(\mathcal{S}) + P(\mathcal{A}|\mathcal{S}^c)P(\mathcal{S}^c) \tag{1}$$

$$ps + q(1-s) \tag{2}$$

and $$P(\mathcal{A}_1, \mathcal{A}_2) = P(\mathcal{A}_1, \mathcal{A}_2|\mathcal{S})P(\mathcal{S}) + P(\mathcal{A}_1, \mathcal{A}_2|\mathcal{S}^c)P(\mathcal{S}^c) =$$

$$P(\mathcal{A}|\mathcal{S})P(\mathcal{A}_2|\mathcal{S})P(\mathcal{S}) + P(\mathcal{A}_1|\mathcal{S}^c)P(\mathcal{A}_2|\mathcal{S}^c)P(\mathcal{S}^c)$$

$$p^2 s + q^2(1-s)$$

which may utilize the fact that $A_1$ and $A_2$ are statistically independent given $\mathcal{S}$. This may yield:

$$P(\mathcal{A}_1|\mathcal{A}_2) = \frac{P(\mathcal{A}_1, \mathcal{A}_2)}{P(\mathcal{A})} \tag{3}$$

$$= \frac{p^2 s + q^2(1-s)}{ps + q(1-s)}. \tag{4}$$

Therefore, for any $0 < q < p < 1$ and $0 < s < 1$:

$$sp^2 + (1-s)q^2 > (sp + (1-s)q)^2 \tag{5}$$

and correlation assessment module 404 may make this assessment by applying Jensen's inequality to the convex function $f(x) = x^2$.

Then, using (2), (4), and (5), correlation assessment module 404 may compute the following:

$$P(\mathcal{A}_1|\mathcal{A}_2) > P(\mathcal{A}_1)$$

To measure this correlation given a dataset, $N_i$ may be defined as the number of alerts which are emitted across all agents for a given tuple of timestamp, testId, and serverId. The assessment value (e.g., score) that correlation assessment module 404 may utilize to capture and/or characterize the cross-agent correlation may be:

$$S_2 = \sum_i N_i(N_i - 1)$$

The times when no alert was issued, or where only one agent has issued an alert, contribute nothing to this assessment value (e.g., score). In various implementations, rather than utilizing $S_2$ directly, correlation assessment module 404 may normalize it. The normalization may include calculating the total number of alerts:

$$S_1 = \sum_i N_i$$

The normalization may proceed, where the total number of distinct tuples (timestamp, testId, serverId) available in the dataset is denoted by T, resulting in the assessment value characterized by:

$$S = \frac{TS_2}{S_1^2}$$

If the alerts are purely random, then this assessment value will be slightly smaller than 1. The absolute value obtained by correlation assessment module 404 may therefore provide an indication to the level of correlation across agents of a studied alert.

With respect to the expected correlation assessment value, consider a matrix of height H and width W of identically distributed Bernoulli random variables $X_{i,j}$, where $i = 1, 2, \ldots, W$ and $j = 1, 2, \ldots, H$, where:

$$X_{i,j} = \begin{cases} 1 & \text{with probability } p \\ 0 & \text{with probability } 1 - p \end{cases}.$$

Suppose further that variables of different columns are independent, whereas those of the same column have a constant covariance y. In other words:

$$Cov(X_{i,j}, X_{h,k}) = \begin{cases} 0 & h \neq i \\ \gamma & h = i \text{ and } j \neq k \end{cases}$$

In various implementations, W corresponds to the length of the detected anomalies series, H to the number of agents running the test, and $X_{i,j}$ to an anomaly being detected (1) or not (0) for a particular agent at a particular time.

To define:

$$N_i = \sum_{j=1}^{H} X_{i,j}$$

$N_i$ represents the number of agents for which an anomaly was detected for a given test and timestamp. Then:

$$EN_i = E\sum_{j=1}^{H} X_{i,j} = \sum_{j=1}^{H} EX_{i,j} = \sum_{j=1}^{H} p = Hp$$

Similarly:

$$EN_i(N_i - 1) = E\left(\sum_{j=1}^{H} X_{i,j}\right)\left(\sum_{j=1}^{H} x_{i,j} - 1\right) = E\left(\sum_{j=1}^{H} X_{i,j}\right)\left(\sum_{j=1}^{H} X_{i,j}\right) - E\left(\sum_{j=1}^{H} X_{i,j}\right) =$$

$$\sum_{j,k=1}^{H} EX_{i,j}X_{i,k} - \sum_{j=1}^{H} EX_{i,j} = \sum_{j=k}^{H} EX_{i,j}X_{i,k} + \sum_{j \neq k=1}^{H} EX_{i,j}X_{i,k} - \sum_{j=1}^{H} EX_{i,j} =$$

$$\sum_{j=1}^{H} EX_{i,j}^2 + \sum_{j \neq k=1}^{H} (EX_{i,j}EX_{i,k} + Cov(X_{i,j}, X_{i,k})) - \sum_{j=1}^{H} EX_{i,j} =$$

$$\sum_{j=1}^{H} EX_{i,j} + \sum_{j \neq k=1}^{H} (p^2 + \gamma) - \sum_{j=1}^{H} EX_{i,j} = H(H-1)(p^2 + \gamma)$$

where the fact $$X_{i,j} = X_{i,j}^2$$

is utilized since $X_{i,j}$ can only take the values of 0 and 1.
Now, it may be denoted:

$$S_1 = \sum_{i=1}^{W} N_i$$

and $$S_2 = \sum_{i=1}^{W} N_i(N_i - 1)$$

Then, by the law of large number, as $W \to \infty$:

$$S = \frac{WES_2}{(ES_1)^2} = \frac{WE \sum_{i=1}^{W} N_i(N_i - 1)}{\left(E \sum_{i=1}^{W} N_i\right)^2} =$$

$$\frac{WE \sum_{i=1}^{W} H(H-1)(p^2 + \gamma)}{\left(\sum_{i=1}^{W} Hp\right)^2} = \frac{W^2 H(H-1)(p^2 + \gamma)}{(WHp)^2} = \frac{H-1}{H}\left(1 + \frac{\gamma}{p^2}\right)$$

When executed, output module 406 may output the result of the operations of the correlation assessment module 404. This output may include and/or be based on the correlation assessment value (e.g., score) produced by correlation assessment module 404. In some instances, this correlation assessment value may be utilized as an optimization criterion for anomaly detection mechanisms. That is, the output from output module 406 may be utilized to evaluate the quality of different anomaly detection mechanisms in order to compare their performance and/or to be utilized in deciding which one of two competing anomaly detection mechanisms is better in an unsupervised setting, when there is no known ground truth. When comparing the output of two anomaly detection mechanisms using their respective assessment values, it may be helpful, but not necessarily mandatory, to have approximately the same number of anomalies detected in each one of them. This may be achieved by manipulating the parameters of at least one of them to bring its detected number of anomalies to that of the anomaly detection mechanism(s) to which it is being compared. This may make the comparison fairer and more accurate, since then all the anomaly detection mechanisms being compared display the same level of sensitivity.

For example, the output of output module 406 may include an assessment of the operation of one or more anomaly detection mechanisms which may be executed by one or more agents and/or by another component of an observability intelligence platform. The assessment may be delivered to a user (e.g., an admin) via a user interface. The assessment may include correlation assessment value (e.g., score) produced by correlation assessment module 404.

In some instances, the assessment may include a characterization, based on the correlation assessment value, of the performance of an anomaly detection mechanism and/or its comparison to another anomaly detection mechanism. This characterization may include a numerical or graphical representation of the characterization of the performance of an anomaly detection mechanism and/or its comparison to another anomaly detection mechanism.

In various implementations, the output may include alerts related to an anomaly detection mechanism being evaluated, statistics related to an anomaly detection mechanism being evaluated, percentiles associated with an anomaly detection mechanism being evaluated, cross-anomaly detection mechanism comparisons, recommendations for anomaly detection mechanisms with better performance, recommendations for model retraining, recommendations for model retraining data sets, etc. for display to a user in monitoring and/or managing anomaly detection mechanism performance, selection, and/or deployment. Additionally, or alternatively, the output may include an automated operation. For example, the output may include an automatic an automated update to an anomaly detection mechanism, such as a model update, a model retraining, a model replacement, etc.

The output of output module 406 may be utilized for model optimization. For example, a performance evaluation for a particular anomaly detector that is output by output module 406 may be utilized as the basis of an update to that detector. The update may include an optimization of one or more model parameters of the particular anomaly detector that is based on the performance evaluation.

Figure 5:
FIG. 5 illustrates an example of an output of an anomaly detection mechanism evaluation.
Figure 5:

FIG. 5 illustrates an example of an output 500 of an anomaly detection mechanism evaluation. In this example, the anomaly detection mechanism evaluation techniques described herein are applied to demonstrate whether a new anomaly detection mechanism is better than an existing one and/or to show that the new anomaly detection mechanism has two free parameters. The anomaly detection mechanism evaluation techniques are utilized to determine the optimal values of these parameters.

The data utilized in this example are time series performance metric data collected from a test performed by an observability intelligence platform. This data consists of different metrics obtained by different agents testing different target servers periodically (e.g., once every few minutes). For instance, an observability intelligence platform agent may test the latency of calls to some server. In this case, the time series consists of the observed latency, in milliseconds (ms), as a function of the time.

The output 500 illustrates an assessment value (e.g., a score resulting from anomaly detection mechanism evaluation performed on the time series data) as a function of the high percentile with low-percentile=10% and k-values evolving to score a similar number of anomalies. That is, in output 500 the Y-axis represents a correlation assessment value arrived at by the operations described above. The X-axis is the value of one of the two free parameters of the anomaly detection assessment value targeted for optimization.

Demonstrating that the new anomaly detection mechanism is better than an existing one is achieved by calculating the correlation value on the legacy anomaly detection mechanism result, which was 3.42. This shows that the new anomaly detection mechanism outperforms the legacy one for all values of the parameter between 0.7 and 0.95. The optimal value for the parameter is taken to be 0.85.

Figure 6:
FIG. 6 illustrates an example simplified procedure for anomaly detection mechanism evaluations, in accordance with one or more implementations described herein.

FIG. 6 illustrates an example of a simplified procedure for anomaly detection mechanism evaluations, in accordance with one or more implementations described herein. For example, a non-generic, specifically configured device (e.g., device 200), may perform procedure 600 (e.g., a method) by executing stored instructions (e.g., anomaly detection evaluation process 248). The procedure 600 may start at step 605, and continues to step 610, where, as described in greater detail above, the device (e.g., a controller, processor, etc.) may obtain anomaly detection time series indicative of anomalies detected by a plurality of anomaly detectors for a network. The anomalies may be associated with anomalous values of a path performance metric.

The plurality of anomaly detectors may generate the anomaly detection time series based on outputs of testing agents configured to perform testing in the network. The anomaly detection time series may be associated with the testing agents performing testing in the network with respect to a particular server. The testing agents may perform testing in the network by sending probing packets via the network.

At step 615, as detailed above, the device may determine a degree of correlation over time between the anomaly detection time series.

At step 620, the device may make, based on the degree of correlation over time between the anomaly detection time series, a performance evaluation for a particular anomaly detector from among the plurality of anomaly detectors s. The performance evaluation may indicate good performance by the particular anomaly detector when the degree of correlation over time indicates a positive correlation between the anomaly detection time series.

In various implementations, the particular anomaly detector may use a different anomaly detection model than at least one other anomaly detector in the plurality of anomaly detectors. The particular anomaly detector may be executed by a router in the network. In some instances, the particular anomaly detector may be updated based on the performance evaluation. Updating the particular anomaly detection may include optimizing a model parameter of the particular anomaly detector based on the performance evaluation.

At step 625, as detailed above, the device may provide the performance evaluation to a user interface for review. Providing the performance evaluation may include providing an assessment value determined by multiplying a sum of the amount of the anomalies, multiplied by itself minus one. In various implementations, providing the performance evaluation may include providing an alert that an anomaly detection mechanism is failing to meet performance criteria.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide a mechanism to evaluate the quality of different anomaly detection mechanisms s in order to compare their performance without necessitating the use of labeled data sets and ground truth knowledge. Instead, by assessing and/or assigning a value to a correlation between the outputs of anomaly detection mechanisms, these techniques produce an evaluation that can serve as an optimization criterion for the anomaly detection algorithm.

While there have been shown and described illustrative implementations that provide for anomaly detection mechanism evaluations, it is to be understood that various other adaptations and modifications may be made within the intent and scope of the implementations herein. In addition, while certain processes are shown, other suitable processes may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method, comprising:

obtaining, by a device, a plurality of anomaly detection time series indicative of anomalies detected by a plurality of anomaly detectors for a network, wherein each of the plurality of anomaly detectors provide a respective anomaly detection time series of the plurality of anomaly detection time series, and wherein the anomalies are associated with anomalous values of a path performance metric;

comparing, by the device, the plurality of anomaly detection time series to determine a degree of correlation over time between the plurality of anomaly detection time series;

making, by the device and based on the degree of correlation over time between the plurality of anomaly detection time series, a performance evaluation for an anomaly detector from among the plurality of anomaly detectors, wherein the anomaly detector uses a different anomaly detection model than at least one other anomaly detector in the plurality of anomaly detectors;

providing, by the device, the performance evaluation to a user interface for review.

2. The method as in claim 1, wherein the performance evaluation indicates good performance by the anomaly detector when the degree of correlation over time indicates a positive correlation between the anomaly detection time series.

3. The method as in claim 1, wherein the plurality of anomaly detectors generates the plurality of anomaly detection time series based on outputs of testing agents configured to perform testing in the network.

4. The method as in claim 3, wherein the plurality of anomaly detection time series are associated with the testing agents performing testing in the network with respect to a particular server.

5. The method as in claim 3, wherein the testing agents perform testing in the network by sending probing packets via the network.

6. The method as in claim 1, wherein the anomaly detector is executed by a router in the network.

7. An apparatus, comprising:

one or more network interfaces;

a processor coupled to the one or more network interfaces and configured to execute one or more processes; and a memory configured to store a process that is executable by the processor, the process when executed configured to:

obtain a plurality of anomaly detection time series indicative of anomalies detected by a plurality of anomaly detectors for a network, wherein each of the plurality of anomaly detectors provide a respective anomaly detection time series of the plurality of anomaly detection time series, and wherein the anomalies are associated with anomalous values of a path performance metric;

compare the plurality of anomaly detection time series to determine a degree of correlation over time between the plurality of anomaly detection time series;

make, based on the degree of correlation over time between the plurality of anomaly detection time series, a performance evaluation for an anomaly detector from among the plurality of anomaly detectors, wherein the anomaly detector uses a different anomaly detection model than at least one other anomaly detector in the plurality of anomaly detectors;

provide the performance evaluation to a user interface for review; and update the anomaly detector based on the performance evaluation, including optimizing a model parameter of the anomaly detector based on the performance evaluation.

8. The apparatus as in claim 7, wherein the performance evaluation indicates good performance by the anomaly detector when the degree of correlation over time indicates a positive correlation between the anomaly detection time series.

9. The apparatus as in claim 7, wherein the plurality of anomaly detectors generates the plurality of anomaly detection time series based on outputs of testing agents configured to perform testing in the network.

10. The apparatus as in claim 9, wherein the plurality of anomaly detection time series are associated with the testing agents performing testing in the network with respect to a particular server.

11. The apparatus as in claim 9, wherein the testing agents perform testing in the network by sending probing packets via the network.

12. The apparatus as in claim 9, wherein the anomaly detector is executed by a router in the network.

13. A tangible, non-transitory, computer-readable medium storing program instructions that cause a device to execute a process comprising:

obtaining a plurality of anomaly detection time series indicative of anomalies detected by a plurality of anomaly detectors for a network, wherein each of the plurality of anomaly detectors provide a respective anomaly detection time series of the plurality of anomaly detection time series, and wherein the anomalies are associated with anomalous values of a path performance metric;

comparing the plurality of anomaly detection time series to determine a degree of correlation over time between the plurality of anomaly detection time series;

making, based on the degree of correlation over time between the plurality of anomaly detection time series, a performance evaluation for an anomaly detector from among the plurality of anomaly detectors, wherein the anomaly detector uses a different anomaly detection model than at least one other anomaly detector in the plurality of anomaly detectors;

providing the performance evaluation to a user interface for review; and updating the anomaly detector based on the performance evaluation, including optimizing a model parameter of the anomaly detector based on the performance evaluation.

14. The tangible, non-transitory, computer-readable medium as in claim 13, wherein the performance evaluation indicates good performance by the anomaly detector when the degree of correlation over time indicates a positive correlation between the anomaly detection time series.

15. The tangible, non-transitory, computer-readable medium as in claim 13, wherein the plurality of anomaly detectors generates the plurality of anomaly detection time series based on outputs of testing agents configured to perform testing in the network.

16. The tangible, non-transitory, computer-readable medium as in claim 15, wherein the plurality of anomaly detection time series are associated with the testing agents performing testing in the network with respect to a particular server.

17. The tangible, non-transitory, computer-readable medium as in claim 15, wherein the testing agents perform testing in the network by sending probing packets via the network.

18. The tangible, non-transitory, computer-readable medium as in claim 13, wherein the anomaly detector is executed by a router in the network.

* * * * *